UNITED STATES PATENT OFFICE.

HERMANN GUMPEL, OF SCHLAGENTHIN, NEAR DAMSDORF-MÜNCHEBERG, GERMANY.

PROCESS OF TREATING RAW POTATOES IN ORDER TO OBTAIN BOTH A CATTLE FOOD AND A PROTEID.

1,047,627.   Specification of Letters Patent.   Patented Dec. 17, 1912.

No Drawing.   Application filed August 14, 1909. Serial No. 512,912.

*To all whom it may concern:*

Be it known that I, HERMANN GUMPEL, farmer, citizen of Germany, subject of the King of Prussia and Emperor of Germany, residing at Schlagenthin, near Damsdorf-Müncheberg, in the Kingdom of Prussia and Empire of Germany, have invented certain new and useful Improvements in Processes for Treating Raw Potatoes in Order to Obtain Both a Cattle Food and a Proteid, of which the following is a full, clear, and exact description.

This invention relates to a process for the treatment of raw potatoes and has for its object to treat the potatoes in such manner as to obtain therefrom on the one hand a durable imperishable animal food which is not prejudicially affected by atmospheric conditions, while on the other, the valuable substances, that is to say, the proteid substances, contained in solution in the potatoes, can be utilized for industrial purposes. This is effected by separating the juices from the potatoes after they have undergone a suitable preliminary treatment and to use these juices for the manufacture of the proteid substances, while the solid residue is used for the manufacture of the durable animal food.

The process is carried out as follows: The potatoes, after being washed, and they may be peeled, are cut by suitable means into small pieces or reduced to pulp. While in this condition the mass has the juice separated from it; this being effected by depriving the cut-up mass of potatoes of its juice, either by means of mechanically exerted pressure, of vacuum, or of the pressure of the air. The process may be carried out in such manner as to remove the juice by means of a single application of pressure or of successive applications of pressure.

In practice it will be found most advantageous to divide the operation of dehydration into a preliminary stage and a subsequent main stage. The first is best effected by vacuum or diffusion of air, or by air pressure, while the latter is best effected by mechanically exerted pressure. The dehydration process may, however, also be carried out in the opposite manner, that is to say, the preliminary dehydration may be effected by mechanically exerted pressure and the subsequent one by vacuum or by air pressure. After the mass has in this manner been deprived of the greater part of its juice, it is ready for drying. After having been sufficiently dried it is ready for shaping and pressing.

The advantages of the pressing operation are due to the fact that the mass is thereby protected from the influence of the air and that the resulting product will consequently remain in good condition for years. Moreover the mass after being pressed will have a volume of only about one-eighth of that of the potatoes from which it has been obtained while its weight will be only about one-fourth. The product can consequently be both cheaply and easily transported.

This invention relates moreover to a method of obtaining the albumin contained in the juice separated from the solid residue of the potatoes. Hitherto it has not been possible to obtain the juice contained in the potatoes in its natural concentrated condition, that is to say, without dilution, and to use the same for industrial purposes.

Now, by means of the process to which this invention relates the juice can be obtained in an undiluted condition. This is effected by using during the whole course of the operation, after it has once been started, only juice obtained from the potatoes, or, in other words, as through the cutting-up of the potatoes a quantity of juice is obtained, this juice is again and again added to the potatoes while they are being cup up, for the purpose of preventing the increase of temperature which would otherwise take place, when the cutting up is effected without the addition of juice.

Albumin is obtained from the juice separated from the potatoes by separating the albuminous substances contained therein either by cold or hot means. The water, after the albuminous substances have been recovered therefrom, may on account of the fertilizing substances contained in it be used in the treatment of the soil for agricultural purposes. The albumin is separated from the juice by heat in the following manner. The juice containing the albumin is heated in a closed container to precipitate the albumin, and the mixture is then filtered, to separate the precipitate from the liquid. The separation of the albumin by heat and cold is affected in the following manner. The fresh juice is mixed with $SO_2$ in the proportion of 2 kg. of acid to 1000 kg. of juice, whereby a part of the albumin is separated. The entire mass having then been carefully mixed is heated in an inclosed vessel until the pressure reaches approximately two atmospheres. The steam is then slowly drawn off and the mass is cooled. The albumin coagulates in large white flakes, which are precipitated so that the water remaining may be decanted.

The importance, from an economical point of view, of the process above described, consists in the fact that every part of the potatoes is made to serve some useful purpose, while the injurious constituents of the raw potato, such as solanin and the like, are by the preliminary dehydration, prevented from forming part of the mass used for feeding purposes but remain in the waste water from which the albuminous substances have been obtained.

With a starch content of the potatoes of 18%, 1 cwt. of raw potatoes will yield 14 kilograms of dry potatoes with a content of water of 15%: according to this, 36 kilograms of water are to be removed, in the following mode: 25 kilograms by mechanical means through a separator and press, thus, 11 kgs. potato juice to be steamed off.

What I claim is:

A process for the treatment of potatoes, which consists in cutting up the potatoes, adding potato juice to the cut-up mass, removing all of the juice from the cut-up mass, precipitating the albuminous substances from the juice, and drying and pressing the precipitate.

In witness whereof, I subscribe my signature in presence of two witnesses.

HERMANN GUMPEL.

Witnesses:
  HENRY HASPER,
  BRUÑO BRUCE.